United States Patent [19]

Schmitz

[11] Patent Number: 4,804,272

[45] Date of Patent: Feb. 14, 1989

[54] COLD JUNCTION COMPENSATION APPARATUS

[75] Inventor: Robert Schmitz, Rosemont, Pa.

[73] Assignee: Honeywell Inc., Minneapolis, Minn.

[21] Appl. No.: 183,431

[22] Filed: Apr. 13, 1988

Related U.S. Application Data

[63] Continuation of Ser. No. 12,474, Feb. 9, 1987, abandoned.

[51] Int. Cl.⁴ .............................................. G01K 7/12
[52] U.S. Cl. ...................................... 374/181; 136/230
[58] Field of Search ......................... 374/182, 181, 208

[56] References Cited

U.S. PATENT DOCUMENTS

| | | | |
|---|---|---|---|
| 142,280 | 4/1817 | Bristol | 374/181 |
| 147,988 | 2/1874 | Smiley | 374/208 |
| 752,452 | 2/1904 | Hohmann | 374/208 |
| 1,025,715 | 5/1912 | Penke | 374/181 |
| 2,535,602 | 12/1950 | Ray | 374/182 X |
| 3,069,909 | 12/1962 | Hines | 374/182 X |
| 3,688,580 | 9/1972 | Jarzembski | 374/182 |
| 4,147,061 | 4/1979 | Wester et al. | 374/171 X |
| 4,157,663 | 6/1979 | Ihlenfeldt et al. | 374/182 X |
| 4,483,632 | 11/1984 | Dewey et al. | 374/182 |
| 4,537,516 | 8/1985 | Epstein | 374/181 X |
| 4,623,266 | 11/1986 | Kielb | 374/181 |

Primary Examiner—Daniel M. Yasich
Attorney, Agent, or Firm—Mitchell J. Halista; Albin Medved

[57] ABSTRACT

A cold junction compensation apparatus utilizes a block of thermally conductive material, such as copper, having a mounting flange extending radially outwardly which is attached to a terminal strip by a machine screw to maintain the screw temperature substantially at the temperature of the block of thermally conductive material. The temperature of the block is sensed by means of a temperature sensor inserted into a hole extending through the block. The sensor is supported on a printed circuit board and is inserted through the hole in the block during assembly of an apparatus using the cold junction temperature compensation. The block is covered by an exterior insulating sleeve to prevent electrical shorts and rapid temperature changes in the block.

3 Claims, 2 Drawing Sheets

4,804,272

COLD JUNCTION COMPENSATION APPARATUS

This application is a continuation of application Ser. No. 07/012,474, filed Feb. 9, 1987, now abandoned.

BACKGROUND OF THE INVENTION

Field of the Invention

The present invention relates to thermocouples. More specifically, the present is directed to a cold junction compensation apparatus for a thermocouple.

Devices for providing cold junction referencing of thermocouples are well-known in the art as shown in U.S. Pat. Nos. 4,157,663 and 4,147,061. Such cold junction compensation is necessary since thermocouples will only provide accurate results in measuring the temperature at the so-called hot junction when the cold junction is at a known temperature. As a result, the output signal from the thermocouple is thereby influenced only by temperature changes at the hot junction rather than the net effect of temperature changes at both the hot and cold junctions. Prior attempts to provide such cold junction compensation have included maintaining the temperature of the cold junction by a thermostatically controlled means in order to provide a constant temperature environment for the cold junction. While that system provides a constant temperature environment for the cold junction, it limits the range of temperature which may be measured by the thermocouple due to the limiting temperature of the cold junction and also requires the use of thermostatic controls for maintaining a constant temperature at the cold junction. Another prior art form of cold junction compensation has included the use of a compensating resistor in a temperature measuring means to compensate for variations in the temperature of the cold junction. Such a solution requires that the value of the resistor be changed whenever different thermocouple materials are used or when the instrument is relocated in a different temperature environment. Another prior art temperature conditioning system is shown in U.S. Pat. No. 4,147,061 which uses a complicated and expensive reference block approach for providing isothermal conditioning of the thermocouple reference junction. This preconditions the lead wire to the same temperature as the reference block and prevents the lead wire from absorbing heat from the reference junction to minimize temperature induced errors. All input leads in that apparatus are connected by electrical screws to terminals on one side of the reference block and output leads are attached to terminals on the opposite side of the block. A calibrated temperature monitoring device is attached to the reference block, and the entire block along with temperature insulating material is enclosed in a case. A multiplicity of connector terminals are arranged to abut an aluminum plate which presses against an insulating rear face of each connector. The aluminum plate acts as an isothermal heat sink for all of the connectors while a temperature sensitive resistor immediately adjacent to the center of the aluminum plate makes it possible to measure and calibrate the temperature of all the reference junctions. Such prior art attempts to provide a cold junction compensation apparatus have various respective limitations which prevent them from being widely adopted in a cost-effective manner. Accordingly, it would be desirable to provide a cold junction compensation apparatus which avoids the complexity and cost of the prior art devices.

SUMMARY OF THE INVENTION

An object of the present invention is to provide an improved cold junction compensation apparatus.

In accomplishing this and other objects, there has been provided, in accordance with the present invention, a cold junction compensation utilizing a thermally conductive block arranged to be attached to a junction terminal strip with a hole through the block being arranged to accommodate a temperature sensor mounted on a circuit board used in an apparatus utilizing a signal from the sensor for temperature compensation and for which the terminal strip forms a wire connecting device.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
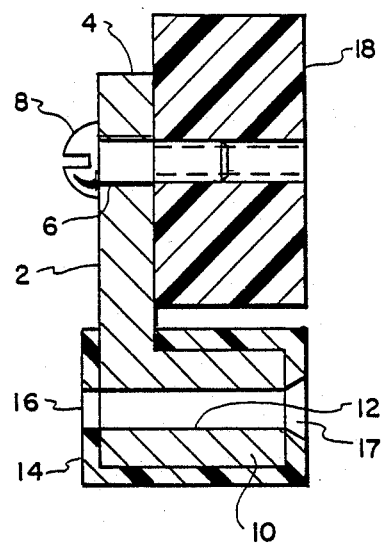
FIG. 1 is a cross-sectional illustration of a cold junction compensating block embodying an example of the present invention.

Referring to FIG. 1 in more detail, there is shown a cold junction compensation device including a thermally conductive block 2 made of a suitable material, e.g., copper. The block 2 has an end flange or ear extending radially outwardly and forming a mounting means for the block 2. A first hole 6 in the mounting ear 4 is arranged to accommodate a mounting screw 8. The body of the block 2 is provided with a second hole 12 extending therethrough and arranged to accommodate a temperature sensor, as discussed hereinafter. An insulating outer layer sleeve 14 is arranged to encompass the body 10 of the block 2 while having a pair of coaxial holes 16 and 17 therein coaxially aligned with the hole 12 in the block 10 to accommodate the temperature sensor. The block 2 is attached by the screw 8 to an electrical wire junction connection or terminal strip 18 which forms a means for connecting wires to external equipment associated with the cold junction compensation apparatus, as described hereinafter.

Figure 2:
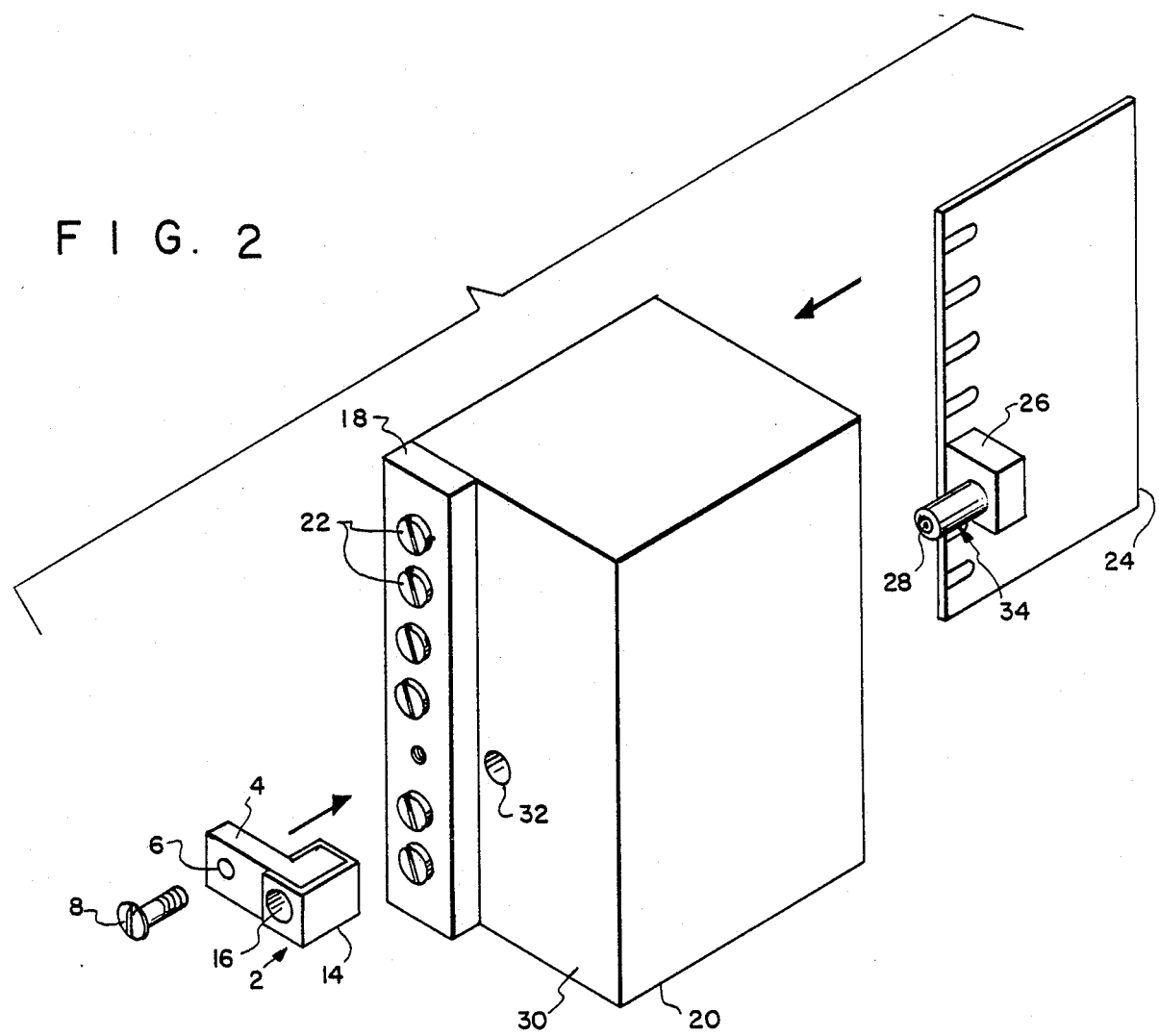
FIG. 2 is an exploded pictorial representation of the components used in applicant's cold junction compensation apparatus and FIG. 3 is an assembled pictorial representation of the components forming applicant's cold junction compensation apparatus.
Figure 3:
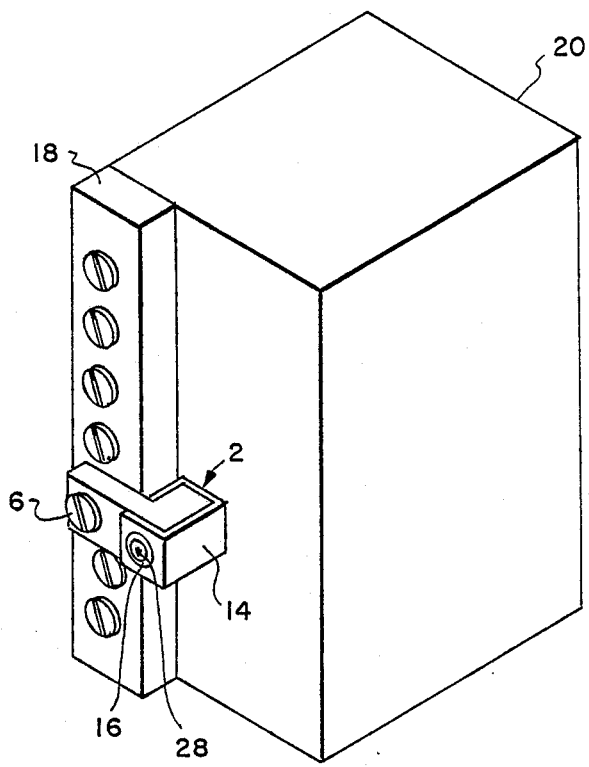

Referring to FIGS. 2 and 3 in more detail, there is shown an exploded and assembled pictorial views of the cold junction compensation apparatus, respectively, embodying an example of applicant's invention. In FIG. 2, there is shown the block 2 with the thermally insulating sleeve 14 thereon while a screw 8 is positioned to capture the ear 4 against the connection strip 18. The connection strip 18 is, in turn mounted on an enclosure 20 for the electrical apparatus associated with the temperature compensation equipment. The connection strip 18 also has a plurality of additional screw heads 22 located thereon for connecting other wires thereto. A printed circuit board 24 is arranged to be inserted into the enclosure 20 and to be retained therein by suitable printed circuit board guiding and supporting means, not shown. The printed circuit board 24 has mounted thereon a support block 26 for supporting a temperature sensor 28 to face a wall 30 of the enclosure 20 on which is mounted the connection strip 18. A hole 32 in the wall 30 is aligned with the temperature sensor 28 when the board 24 is inserted in the enclosure 20 to allow the temperature sensor 28 to pass therethrough. The temperature sensor 28 includes an elongated extension 34 which is effective to position the temperature sensor 28 within the hole 12 in the block 2 when the printed circuit board 24 is mounted within the enclosure 20.

As shown in FIG. 3, the assembled temperature compensation apparatus has the block 2 mounted on the enclosure 20 with the temperature sensor 28 extending through the hole 16 while the ear 4 on the block 2 is captured by the screw 8 on the terminal strip 18. In this arrangement, the temperature of the block 2 is sensed by the temperature sensor 28 which is effective to generate an electrical output signal to be utilized to provide a temperature compensation operation by a suitable circuit on the board 24. The thermal conductivity of the block 2 either causes heat to flow into or out of the screw 8 in order to maintain the screw temperature very close to the temperature of the block 2. By sensing the temperature of the block by the temperature sensor 28, the temperature of the thermocouple junction which is captured under the screw 8 is also sensed to provide a cold junction temperature compensation capability. The insulation layer 14 on the block 2 prevents electrical short circuits and minimizes rapid temperature changes in the block 2.

Accordingly, it may be seen, that there has been provided, in accordance with the present invention, an improved cold junction temperature compensation apparatus.

The embodiments of the present invention in which an exclusive property or privilege is claimed are defined as follows:

1. An apparatus comprising
   a block of thermally conductive material having a mounting flange radially extending from said block with a mounting hole extending through said flange,
   a sensor locating hole extending through said block and displaced from said mounting flange,
   a temperature sensor located in said locating hole and arranged in a heat transfer relationship to sense a temperature of said block,
   a terminal strip having at least one threaded hole therein,
   a mounting screw extending through said mounting hole into said threaded hole to capture said flange against said strip with said block adjacent to said strip,
   a first mounting means including a mounting wall for supporting said terminal strip and a sensor aligning hole in said wall adjacent to said strip and axially aligned with said sensor locating hole and
   a second mounting means carried by said first mounting means for concurrently supporting said sensor in said aligning hole and said locating hole to enable said sensor to sense the temperature of said block.

2. An apparatus as set forth in claim 1 wherein said first mounting means includes a printed circuit card holder and said second mounting means includes a printed circuit card located in said holder and having said sensor attached to said card.

3. An apparatus as set forth in claim 1 and further including a thermally insulating sleeve surrounding said block while providing access to said locating hole by said sensor.

* * * * *